United States Patent

Spindelbalker

(10) Patent No.: US 7,059,716 B2
(45) Date of Patent: Jun. 13, 2006

(54) DEVICE FOR FIXING A STRUCTURAL PART TO AN EYEGLASS LENS

(75) Inventor: Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 10/509,821

(22) PCT Filed: Mar. 27, 2003

(86) PCT No.: PCT/AT03/00085

§ 371 (c)(1),
(2), (4) Date: Sep. 30, 2004

(87) PCT Pub. No.: WO03/083553

PCT Pub. Date: Oct. 9, 2003

(65) Prior Publication Data

US 2005/0128429 A1   Jun. 16, 2005

(30) Foreign Application Priority Data

Apr. 3, 2002   (AT) ............................... A 516/2002

(51) Int. Cl.
*G02C 1/02*   (2006.01)

(52) U.S. Cl. ...................................... 351/110; 351/124
(58) Field of Classification Search ................ 351/110, 351/41, 124, 140, 147, 146, 145, 149, 150
See application file for complete search history.

(56) References Cited

U.S. PATENT DOCUMENTS

| 6,210,002 B1 * | 4/2001 | Tachibana .................... 351/110 |
| 6,250,755 B1 | 6/2001 | Conner et al. |
| 6,682,192 B1 * | 1/2004 | Conner ....................... 351/110 |

FOREIGN PATENT DOCUMENTS

| DE | 21 36 802 | 2/1979 |
| DE | 42 17 908 | 1/1993 |
| EP | 0 561 763 | 9/1993 |
| EP | 0 718 660 | 6/1996 |
| FR | 1 069 240 | 7/1954 |
| WO | WO 02 33 474 | 4/2002 |

* cited by examiner

*Primary Examiner*—Hung Xuan Dang
(74) *Attorney, Agent, or Firm*—Collard & Roe, P.C.

(57) ABSTRACT

An apparatus is described for fastening a constructional element (1) to a spectacle lens (2) with a butt end (8) of a constructional element (1) which overlaps the lens edge, with two parallel fastening pins (4) which project from the butt end (8) and form annular enlargements (5) which are barb-like in their cross section, and with plastic sleeves (6) which can be inserted into bores in the spectacle lens (2) and form a head overlapping the edge of the bore and in which the fastening pins (4) engage in an interlocking way under deformation of the sleeve wall from the side of the bore opposite of the heads. In order to provide advantageous constructional conditions it is proposed that the butt end (8) with the two fastening pins (4) is made of plastic, that the two plastic sleeves (6) are mutually connected via a joint stop head (7) and that the modulus of elasticity of the plastic of the fastening pins (4) corresponds to at least three times the modulus of elasticity of the plastic of the plastic sleeves (6).

2 Claims, 1 Drawing Sheet

DEVICE FOR FIXING A STRUCTURAL PART TO AN EYEGLASS LENS

CROSS REFERENCE TO RELATED APPLICATIONS

Applicant claims priority under 35 U.S.C. §119 of AUSTRIAN Application No. A 516/2002 filed on Apr. 3, 2002. Applicant also claims priority under 35 U.S.C. §365 of PCT/AT03/00085 filed on Mar. 27, 2003. The international application under PCT article 21(2) was not published in English.

FIELD OF THE INVENTION

The invention relates to an apparatus for fastening a constructional element to a spectacle lens with a butt end of a constructional element which laps over the lens edge, with two parallel fastening pins which project from the butt end and form annular enlargements which are barb-like in their cross section, and with plastic sleeves which can be inserted into bores in the spectacle lens and form a head overlapping the edge of the bore and in which the fastening pins engage in an interlocking way under deformation of the sleeve wall from the side of the bore opposite of the heads.

DESCRIPTION OF THE PRIOR ART

For the purpose of fastening a metallic constructional element such as a nose saddle or side of spectacles to a spectacle lens it is known to solder or weld two projecting, parallel fastening pins to a butt end projecting beyond the edge of the spectacle lens, which fastening pins are provided with annular enlargements which are barb-like in their cross section and are held in two bores in the spectacle lens close to the edge. For this purpose, plastic sleeves are inserted into the bores which are provided with a head which overlap the edge of the bore at one end. The fastening pins which are pressed into the plastic sleeves from the side opposite of the head cut with their barb-like annular enlargements into the plastic sleeves, thus leading to an interlocking connection which axially secures the fastening pins because the fastening pins clawed into the plastic sleeves cannot be pulled out from the bores due to the axial support of the plastic sleeves via the heads. The parallel fastening pins moreover offer a torsion-proof support, thus providing advantageous fastening conditions. In order to enable the use of this kind of fastening for constructional elements made of plastic, a wire bow which forms the two fastening pins could be embedded in the butt end. This would lead to a considerable increase in the constructional work and would moreover entail a widening of the butt end overlapping the edge of the lens in order to enable the secure anchoring of the wire bow in the plastic material.

SUMMARY OF THE INVENTION

The invention is thus based on the object of providing an apparatus for fastening a constructional element made of plastic to a spectacle lens in such a way that simple mounting conditions can be ensured in combination with small dimensions of the butt end, without having to make do without a durable and resilient connection.

Based on an apparatus for fastening a constructional element to a spectacle lens of the kind mentioned above, the invention achieves this object in such a way that the butt end with the two fastening pins is made of plastic, that the two plastic sleeves are mutually connected via a joint stop head and that the modulus of elasticity of the plastic of the fastening pins corresponds to at least three times the modulus of elasticity of the plastic of the plastic sleeves.

The integral molding of the butt end with the two fastening pins made of plastic firstly offers simple constructional conditions which do not cause any widening of the butt end, so that comparatively small dimensions of the butt end can be achieved, which is of relevant importance concerning the overlap of the spectacle edge and the thus possible visual impairment. Despite the formation of the fastening pins of plastic, a sufficiently traction-proof anchoring of the fastening pins in the plastic sleeves can be ensured by means of the annular enlargements which are barb-like over their cross section when the modulus of elasticity of the plastic material of the fastening pins corresponds to at least three times the modulus of elasticity of the plastic material of the plastic sleeves because although in this case the annular enlargements of the fastening pins do not have a sufficient hardness to cut into the plastic sleeves, they are nevertheless hard enough to achieve a cold flowing of the sleeve material in the region of the plastic sleeves with the effect that annular grooves form on the inner wall of the plastic sleeves, which as a result of the thus achieved interlocking allow a durable, traction-proof anchoring of the fastening pins in the plastic sleeves. In this connection it must be noted that the possible hardness of the fastening pins is limited by the brittleness which increases with the hardness and which needs to be kept within permissible limits. Moreover, fastening pins made of plastic require larger pin diameters in comparison with wire pins for the purpose of absorbing the occurring loads. Larger pin diameters lead to a lower clearance between the fastening pins at the same dimensions of the butt end, which causes difficulties in the support of the plastic sleeves at the bore edges beyond their heads due to lack of space. In order to take this into account, the two plastic sleeves are joined to each other by way of a common stop head. This not only leads to especially simple mounting conditions because the two plastic sleeves are handled jointly, but this also considerably improves the axial support of the plastic sleeves at the bore edges, so that fastening conditions for plastic parts can be achieved by the measures in accordance with the invention which can easily be compared to known conditions for joining spectacle glass with metallic constructional elements.

As was already explained above, the cold-flowing behavior of the plastic sleeves play an important role in the traction-proof anchoring of the fastening pins in the plastic sleeves. Especially advantageous conditions are obtained in this connection when the two plastic sleeves consist of a crystalline plastic material and the fastening pins are made of an amorphous plastic material because crystalline plastic materials have a substantially better cold-flowing behavior as compared with amorphous plastic materials.

BRIEF DESCRIPTION OF THE DRAWINGS

The subject matter of the invention is shown in the drawings by way of example, wherein.

DESCRIPTION OF THE PREFERRED EMBODIMENTS

Figure 1:
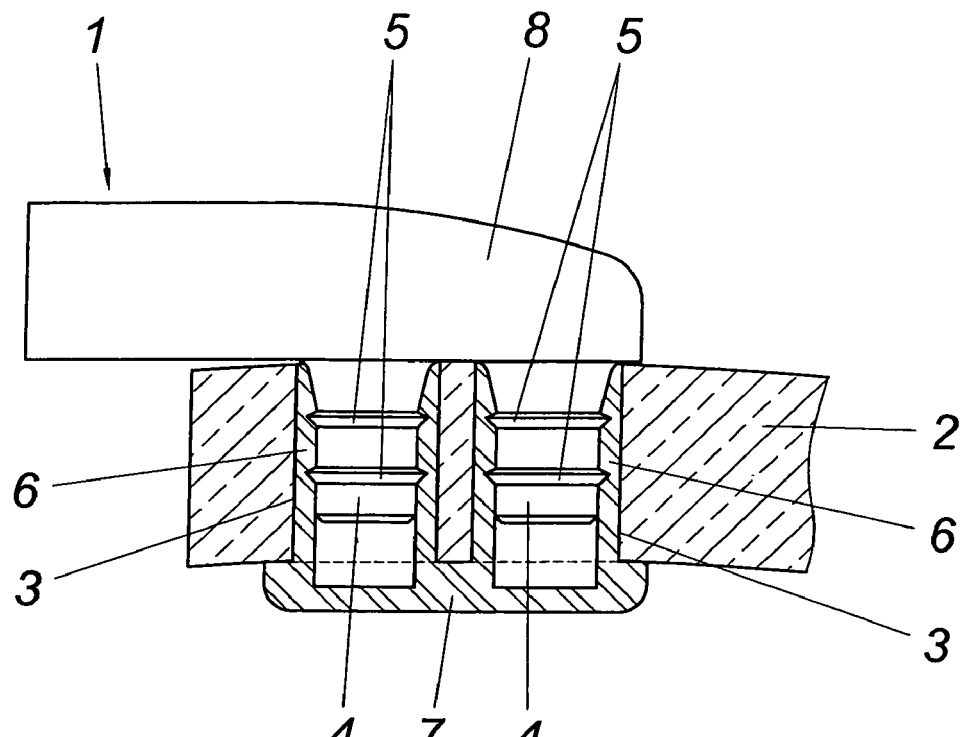
FIG. 1 shows an apparatus in accordance with the invention for fastening a constructional element made of plastic to a spectacle lens in a simplified sectional view.
Figure 2:
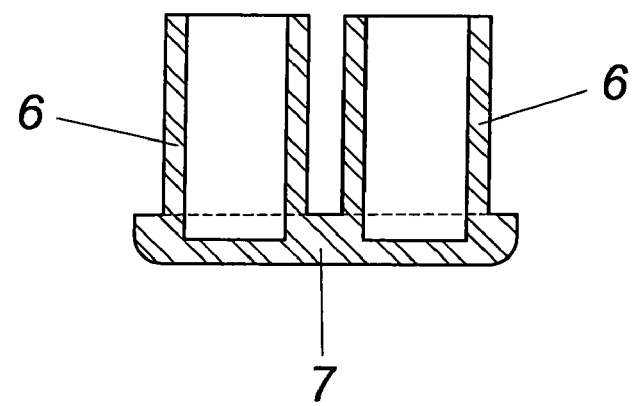
FIG. 2 shows the plastic sleeves required for this fastening apparatus, also shown in a sectional view.

In order to fasten a constructional element 1 made of plastic such as a nose saddle or a side to a spectacle lens 2, the spectacle lens 2 comprises two adjacent parallel bores 3 in which the fastening pins 4 engage which are formed on the constructional element 1. Said fastening pins 4 are provided with annular enlargements 5 which have a barb-like cross section. The fixing of the fastening pins 4 does not occur directly in the bores 3 of the spectacle lens 2 but by way of plastic sleeves 6 which are inserted via bores 3 and which are mutually connected by way of a joint stop head 7. The plastic sleeves 6 are inserted in the bores 3 from the side of the spectacle lens 2 which is opposite of the constructional element 1 until the stop head 7 radially projecting beyond the sleeve walls stops on the edge of the bore and forms an abutment which prevents the extraction of the plastic sleeves 6 from the bores 3 on the side of the spectacle lens 2 which is opposite of the stop head 7.

The fastening pins 4 which are provided on a butt end 8 of the constructional element 1 which overlaps the edge of the lens claw with their annular enlargements 5 which are barb-like in their cross sections in the sleeve walls, thus producing a sufficiently traction-proof connection between the fastening pins 4 and the plastic sleeves 6, namely with the effect that the constructional part 1 is permanently joined to the spectacle lens 2 because the fastening pins 4 cannot be extracted without a respective application of force from the plastic sleeves 6 enclosed on the circumferential side by the bores 3 in the spectacle lens 2. The precondition for this is, however, that the modulus of elasticity of the plastic material of the fastening pins 4 corresponds at least to three times the modulus of elasticity of the plastic material of the plastic sleeves 6. This measure ensures that the annular enlargements 5 will press into the sleeve walls and will produce a cold flowing of the plastic material of the plastic sleeves as a result of the pressure load with the effect that annular grooves are formed in the sleeve walls in which the annular enlargements 5 of the fastening pins 4 engage in an interlocking fashion, so that a sufficient holding force for fastening the constructional element 1 to the spectacle lens 2 is built up as a result of the interlocking connection between fastening pins 4 and the plastic sleeves 6. Notice must be taken in this connection that the hardness of the constructional element could be increased for increasing the holding force. This however will lead to the likelihood of brittle fractures in the region of the fastening pins 4. In order to meet these partly contradictory requirements, amorphous plastic materials have proven to be best for constructional elements 1 to be fastened to spectacle lenses 2, which amorphous plastic materials have a yield stress of 60 MPa and a modulus of elasticity of 1500 MPa with a low tendency to cold flowing. The plastic sleeves 6 were made of a crystalline plastic material with a yield stress of 25 MPa and a modulus of elasticity of 450 MPa with favorable cold flowing properties. If the ratio of the moduli of elasticity as a result of harder plastic sleeves 6 (the strength of the fastening pins 4 is substantially predetermined by the requirements placed on the constructional element and the tolerable brittleness of the fastening pins 4) falls below three times, the barb-like annular enlargements 5 are increasingly deformed and the pressure in the bores 3 of the spectacle lens 2 will rise, which is thus subjected to an increasing likelihood of breakage. If the ratio of the moduli of elasticity is increased, i.e. the plastic sleeves are provided with a softer configuration, the holding force of the fastening will decrease.

The invention claimed is:

1. An apparatus for fastening a butt end of a constructional element to a spectacle lens, the butt end overlapping an edge of the spectacle lens, comprising two parallel plastic fastening pins integral with the butt end and projecting therefrom, the plastic fastening pins having annular enlargements of barb-shaped cross section, two plastic sleeves inserted in bores in the spectacle lens, and a joint stop head connecting the two plastic sleeves and overlapping the spectacle lens edge, the plastic fastening pins engaging the plastic sleeves from an end of the bores opposite the stop head and with the annular enlargements interlocking with the plastic sleeve walls under deformation of the sleeve walls, and the plastic of the fastening pins having a modulus of elasticity corresponding to at least three times the modulus of elasticity of the plastic of the sleeves.

2. The apparatus of claim 1, wherein the plastic of the sleeves is a crystalline plastic material and the plastic of the fastening pins is an amorphous plastic material.

* * * * *